Patented Aug. 22, 1939

2,170,009

UNITED STATES PATENT OFFICE 2,170,009

PREPARATION OF CELLULOSE ETHERS

Hans T. Clarke, New York, and Carl J. Malm, Rochester, N. Y., assignors to Eastman Kodak Company, Rochester, N. Y., a corporation of New Jersey No Drawing. Application February 12, 1937, Serial No. 125,464

3 Claims. (Cl. 260—231)

This application relates to a method of preparing cellulose ethers in which tertiary butyl or tertiary amyl alcohol is employed as the solvent therein.

In the preparation of cellulose ethers, cellulose which has been treated with alkali is reacted upon with an etherifying agent, such as ethyl chloride. This process usually leaves the cellulose intact, as to physical structure, and the cellulose ether can be separated from the reaction ingredients by filtration. If, however, the process is carried out in the presence of a solvent, the cellulose ether is dissolved and the reaction occurs more uniformly resulting in a more homogeneous product and in a mass which can be more conveniently handled. The use of a solvent also allows the preparation of cellulose ethers which have good solubilities and which can be employed for the preparation of sheeting having good flexibilities.

The solvents which have usually been employed in the preparation of cellulose ethers resulting in a solution are hydrocarbons, such as benzene. Due to the insolubility of these hydrocarbons in water the precipitation in water of a cellulose ether from its reaction mixture in which it is dissolved is not practical. The use of the primary alcohols and the ketones as solvents in an etherification process is not desirable as these compounds are usually either reactive with some of the ingredients of the etherification bath or are decomposed therein. These solvents also have a tendency to remove alkali from the alkali cellulose which is used, thereby rapidly hydrolyzing the etherifying agent dissolved in the solvent. A comparatively large excess of etherifying agent is therefore required.

An object of our invention is to provide a method of preparing cellulose ethers in dope form in a solvent which permits of obtaining cellulose ethers which are homogeneous and have good characteristics. Another object of our invention is to provide a process for etherifying cellulose in which the amount of etherifying reagent used is restricted to only slightly more than that necessary for the etherification thus decreasing the cost of the process. Other objects of our invention will appear herein. The prior art teaches that tertiary alcohols have little or no solvent action on cellulose ethers. We have found that tertiary butyl and tertiary amyl alcohols are especially well suited for solvents in cellulose etherification processes. We have found that a solvent to be employed in the manufacture of cellulose ethers should have the following properties:

1. It should be a good solvent for the cellulose ether at the etherification temperature.
2. It should be a solvent for the alkyl chloride and a poor solvent for alkali.
3. It should not react with alkali or alkyl chloride or decompose in the etherification process.

Tertiary butyl and amyl alcohol fill all these requirements.

We have found that the tertiary alcohols are such good solvents for cellulose ethers at elevated temperatures that it is only necessary to employ ethyl chloride in an etherification process in amounts slightly above that required to introduce the desired ethoxyl. We have found that the use of this type of a solvent facilitates the obtaining of high viscosity cellulose ethers by decreasing the rate of hydrolysis of the ethyl chloride and thereby slows down the rate at which the etherification bath becomes acid. We have found that because of the excellent solvent power of the tertiary alcohols, at the etherification temperatures, a better dope is formed by the ethers prepared in accordance with our invention. Also by our invention the cellulose ether formed may be readily separated from the reaction mixture by precipitating in water, as the tertiary alcohols are sufficiently soluble in water to permit such precipitation.

Our invention includes broadly, solvent processes of making cellulose ethers in which tertiary butyl or tertiary amyl alcohol is employed as the solvent. As a general rule, however, a process in accordance with our invention would be carried out by first treating celluose with aqueous alkali to form an etherifiable alkali cellulose therefrom after which the alkali cellulose is treated with an etherifying agent and a tertiary alcohol as the solvent to form a cellulose ether therefrom. The following examples illustrate our invention:

*Example I*

150 parts of refined sulfite wood pulp (95% alpha cellulose content) was soaked in 50% aqueous sodium hydroxide for 4 hours. The excess liquid was centrifuged off leaving 500 parts of solution on the fibers. This pulp was broken up and added to an autoclave containing a mixture of 600 parts of tertiary butyl alcohol and 300 parts of ethyl chloride. The mass was maintained at 120° C. for 8 hours which resulted in a uniform dope. The cellulose ether was separated out by precipitating in water and then washing and drying. It was found to have an ethoxyl content of 42.5%.

*Example II*

The process of Example I was repeated except that tertiary amyl alcohol was employed as the solvent instead of tertiary butyl alcohol. The cellulose ether formed was separated from the reaction mixture by precipitating into water, washed and dried. It had an ethoxyl content of 46%.

As pointed out in Fordyce and Stampfli application Serial No. 125,644 filed February 13, 1937, it is preferred that the cellulose employed as the starting material, have a cuprammonium viscosity of at least 20 centipoises in 2½% concentration. It is also preferred that the time and temperature of the etherification be such that the reaction mass will not turn acid. In this way a product will be obtained having a comparatively high viscosity which as pointed out by Fordyce and Stampfli is desirable for the preparation of sheeting of good quality.

It is to be understood that the invention is not to be limited by the proportions given in the examples as larger amounts of ethyl chloride may be employed, as desired. Nevertheless, one of the advantages of using a tertiary alcohol, as the solvent, is to decrease the rate of hydrolysis of the ethyl chloride. For instance, the amount of liquid used may be approximately 10 parts to one of cellulose and the amount of ethyl chloride employed may be only 4 or, as shown in the examples, even 3 parts. In the carrying out of etherification processes in accordance with our invention, it is, of course, desirable that a container be employed which is resistant to the etherifying reagents. A nickel lined container, preferably with a nickel-surfaced agitating element therein is considered to be the most practical for this purpose.

We claim:

1. A process for preparing cellulose ethers which comprises treating cellulose with aqueous caustic alkali of at least 40% concentration, removing some of the liquid therefrom by pressure and treating the resulting mass with a bath containing an etherifying halide and a tertiary alcohol of 4-5 carbon atoms as a solvent therein.

2. A process for preparing cellulose ethers which comprises soaking cellulose having a cuprammonium viscosity of at least 20 centipoises in aqueous caustic alkali of at least 40% concentration for at least 3 hours, removing the excess alkali therefrom by centrifuging and then etherifying the cellulose with a bath containing ethyl chloride and a tertiary alcohol of 4-5 carbon atoms and terminating the reaction before the reaction mixture becomes acid.

3. A process for preparing cellulose ethers which comprises soaking cellulose with aqueous caustic alkali of at least 40% concentration, removing some of the liquid therefrom by pressure and treating the resulting mass with a bath containing ethyl chloride and a tertiary alcohol of 4-5 carbon atoms as a solvent therein.

HANS T. CLARKE.
CARL J. MALM.